US012716107B2

(12) United States Patent
Georges et al.

(10) Patent No.: US 12,716,107 B2
(45) **Date of Patent: *Aug. 25, 2026**

(54) PRESS HARDENING METHOD

(71) Applicant: ARCELORMITTAL, Luxembourg (LU)

(72) Inventors: Cédric Georges, Novilles-les-bois (BE); Florin Duminica, Tilff (BE); Thierry Sturel, Le Ban Saint Martin (FR); Pascal Drillet, Rozerieulles (FR)

(73) Assignee: ArcelorMittal, Luxembourg (LU)

( * ) Notice: Subject to any disclaimer, the term of this patent is extended or adjusted under 35 U.S.C. 154(b) by 1255 days.

This patent is subject to a terminal disclaimer.

(21) Appl. No.: 16/097,466

(22) PCT Filed: Apr. 26, 2017

(86) PCT No.: PCT/IB2017/000482

§ 371 (c)(1),
(2) Date: Oct. 29, 2018

(87) PCT Pub. No.: WO2017/187255

PCT Pub. Date: Nov. 2, 2017

(65) Prior Publication Data

US 2019/0144963 A1 May 16, 2019

(30) Foreign Application Priority Data

Apr. 29, 2016 (WO) .................. PCT/IB2016/000549

(51) Int. Cl.

| | |
|---|---|
| ***C23C 28/02*** | (2006.01) |
| ***B21D 22/02*** | (2006.01) |
| ***B32B 15/01*** | (2006.01) |
| ***C21D 1/673*** | (2006.01) |
| ***C21D 8/04*** | (2026.01) |
| ***C23C 2/12*** | (2006.01) |
| ***C23C 2/26*** | (2006.01) |
| ***C23C 2/28*** | (2006.01) |
| ***C23C 30/00*** | (2006.01) |

(52) U.S. Cl.

CPC ............. *C21D 8/04* (2013.01); *B21D 22/022* (2013.01); *B32B 15/015* (2013.01); *C21D 1/673* (2013.01); *C23C 2/12* (2013.01); *C23C 2/26* (2013.01); *C23C 2/261* (2022.08); *C23C 2/29* (2022.08); *C23C 28/021* (2013.01); *C23C 30/00* (2013.01); *C21D 2211/002* (2013.01); *C21D 2211/005* (2013.01); *C21D 2211/008* (2013.01)

(58) Field of Classification Search

CPC ..... B32B 15/01; B32B 15/013; B32B 15/015; B32B 15/012; C21D 1/673; C21D 5/10; C21D 5/12; C21D 6/00–008; C21D 7/13; C21D 8/005; C21D 8/02; C21D 8/0205; C21D 8/0278; C21D 8/04; C21D 8/0405; C21D 8/0478; C25D 5/10; B21D 22/022

See application file for complete search history.

(56) References Cited

U.S. PATENT DOCUMENTS

| | | | | |
|---|---|---|---|---|
| 3,204,917 A * | 9/1965 | Richards | .................. | C03B 9/48 164/24 |
| 4,555,275 A | 11/1985 | Tobin | | |
| 7,799,148 B2 | 9/2010 | Colin et al. | | |
| 8,722,203 B2 | 5/2014 | Laurent et al. | | |
| 9,314,997 B2 | 4/2016 | Sohn et al. | | |
| 10,253,418 B2 | 4/2019 | Allely et al. | | |
| 2003/0049485 A1* | 3/2003 | Brupbacher | ............ | C23C 28/00 428/626 |
| 2006/0130940 A1* | 6/2006 | Kollaritsch | ............ | C22C 38/12 148/534 |
| 2006/0265926 A1* | 11/2006 | Sietsema | ................ | C23C 28/34 42/76.02 |
| 2007/0163685 A1* | 7/2007 | Kusumi | .................... | C23C 2/28 148/530 |
| 2008/0035249 A1 | 2/2008 | Scott et al. | | |
| 2010/0003538 A1* | 1/2010 | Nikolov | ................ | C23C 14/025 428/626 |
| 2011/0006491 A1 | 1/2011 | Spehner et al. | | |
| 2011/0165436 A1 | 7/2011 | Drillet et al. | | |
| 2012/0118437 A1* | 5/2012 | Wang | .................... | B32B 15/013 427/321 |
| 2014/0030635 A1* | 1/2014 | Nakada | .................... | C25D 5/50 428/656 |
| 2014/0216610 A1 | 8/2014 | Nakamura et al. | | |
| 2015/0314567 A1* | 11/2015 | Böger | ....................... | C23C 2/12 428/656 |

(Continued)

FOREIGN PATENT DOCUMENTS

| | | |
|---|---|---|
| CN | 101070587 A * | 11/2007 |
| DE | 102010030465 A | 12/2011 |

(Continued)

OTHER PUBLICATIONS

Lesage et al., "Role of hydrogen on adhesion of NiCr thermal sprayed coatings", 2000. Thin Solid Films, vol. 377-378, pp. 675-680. (Year: 2000).*
Ak et al, "NiCr Coatings on stainless steel by HVOF technique", 2003. Surface and Coatings Technology, vol. 173-174, pp. 1070-1073. (Year: 2003).*
CN 101070587 machine translation (Year: 2007).*
JP S59-193264 machine translation (Year: 1984).*
Search Report issued in connection with PCT/IB2017/000482, on Aug. 16, 2017.
Written Opinion of the International Searching Authority issued in connection with PCT/IB2017/000482, on Aug. 16, 2017.
Search Report issued in connection with PCT/IB2016/000549, on Sep. 1, 2017.

(Continued)

*Primary Examiner* — Stephani Hill
(74) *Attorney, Agent, or Firm* — Davidson Kappel LLC

(57) ABSTRACT

A carbon steel sheet coated with a barrier pre-coating containing nickel and chromium in a weight ratio between 1.5 and 9, and a press hardening method for providing the carbon steel sheet coated with a barrier pre-coating comprising nickel and chromium are described.

9 Claims, No Drawings

(56) References Cited

U.S. PATENT DOCUMENTS

| | | | | |
|---|---|---|---|---|
| 2016/0024610 | A1 | 1/2016 | Tanahashi et al. | |
| 2016/0031186 | A1* | 2/2016 | Mourer | B32B 15/013 428/656 |

FOREIGN PATENT DOCUMENTS

| | | | | |
|---|---|---|---|---|
| EP | 510224 | A1 * | 10/1992 | C25D 5/10 |
| EP | 2684985 | A1 | 1/2014 | |
| JP | 59193264 | A * | 11/1984 | C23C 4/08 |
| JP | 2001115272 | A | 4/2001 | |
| JP | 2002317239 | A | 10/2002 | |
| JP | 2007302982 | A | 11/2007 | |
| JP | 2011122207 | A | 6/2011 | |
| JP | 2011246801 | A | 12/2011 | |
| JP | 2012197505 | A | 10/2012 | |
| JP | 2013248645 | A | 12/2013 | |
| JP | 2014 - 527120 | A | 10/2014 | |
| KR | 20140042110 | A | 4/2014 | |
| KR | 20150008114 | A | 1/2015 | |
| RU | 2395593 | C1 | 7/2010 | |
| RU | 2499847 | C2 | 11/2013 | |
| WO | 9109684 | A | 7/1991 | |
| WO | WO2007135092 | A1 | 11/2007 | |
| WO | 2008110670 | A | 9/2008 | |

OTHER PUBLICATIONS

Written Opinion of the International Searching Authority issued in connection with PCT/IB2016/000549, on Sep. 1, 2017.

Lesage et al. “Role of hydrogen on adhesion of NiCr thermal sprayed coatings”, Thin Solid Films, Elsevier-Sequoia S. A. Lausanne, CH, vol. 377-378, (Dec. 1, 2000) pp. 675-680.

* cited by examiner

PRESS HARDENING METHOD

The present invention relates to a press hardening method comprising the provision of a carbon steel sheet coated with a barrier pre-coating which inhibits hydrogen adsorption and a part having excellent resistance to delayed cracking. The invention is particularly well suited for the manufacture of automotive vehicles.

BACKGROUND OF THE INVENTION

It is known that certain applications, especially in the automotive field, require metal structures to be further lightened and strengthened in the event of an impact, and also good drawability. To this end, steels having improved mechanical properties are usually used, such steel being formed by cold and hot-stamping.

However, it is known that the sensitivity to delayed cracking increases with the mechanical strength, in particular after certain cold-forming or hot-forming operations since high residual stresses are liable to remain after deformation. In combination with atomic hydrogen possibly present in the Carbon steel sheet, these stresses are liable to result in delayed cracking, that is to say cracking that occurs a certain time after the deformation itself. Hydrogen may progressively build up by diffusion into the crystal lattice defects, such as the matrix/inclusion interfaces, twin boundaries and grain boundaries. It is in the latter defects that hydrogen may become harmful when it reaches a critical concentration after a certain time. This delay results from the residual stress distribution field and from the kinetics of hydrogen diffusion, the hydrogen diffusion coefficient at room temperature being low. In addition, hydrogen localized at the grain boundaries weakens their cohesion and favors the appearance of delayed intergranular cracks.

To overcome this problem, it is usually know to modify the composition of the steel to prevent the adsorption of hydrogen into the steel.

For example, the patent application US2008035249 discloses a TWIP steel comprising at least one metal element chosen from vanadium, titanium, niobium, chromium and molybdenum, where 0.050%≤V≤0.50%; 0.040%≤Ti≤0.50%; 0.070%≤Nb≤0.50%; 0.070%≤Cr≤2%; 0.14%≤Mo≤2% and, optionally, one or more elements chosen from 0.0005%≤B≤0.003%; Ni≤1% Cu≤5%, the balance of the composition consisting of iron and inevitable impurities resulting from the smelting, the amounts of metal elements in the form of precipitated carbides, nitrides or carbonitrides being: 0.030%≤Vp≤0.150%; 0.030% Tip≤0.130%; 0.040%≤Nbp≤0.220%; 0.070%≤Crp≤0.6%; 0.14%≤Mop≤0.44%. Indeed, the inventors firstly demonstrated that precipitated vanadium, titanium or niobium carbides, nitrides or carbonitrides are very effective as hydrogen traps. Chromium or molybdenum carbides may also fulfill this role.

Nevertheless, when hot-forming is performed, such modifications are not sufficient. Indeed, when a carbon steel sheet has to be hardened by press-hardening process, there is a high risk that the steel adsorbs hydrogen originating from the dissociation of H2O in the furnace during the austenitization treatment.

DE102010030465 discloses a method for the production of a sheet metal formed part which is provided with a corrosion protection coating and is formed from a high tensile steel sheet material. This method comprises the following steps:

- transforming a provided output sheet material into a sheet metal blank;
- formation of the anti-corrosive coating by electrolytic application of a zinc-nickel coating (C) to the sheet metal part, whereby at the beginning of the coating process a thin nickel layer is first deposited, which also prevents hydrogen embrittlement of the steel sheet material.

DE102010030465 further relates to a hot-formed and, in particular, press-hardened sheet-metal part (P) made of a high-tensile steel sheet material with an electrolytically applied zinc-nickel coating (C). It is mentioned that the heat treatment serves to expel the hydrogen contained in the starting sheet material and the hydrogen (which is to be substantially prevented by the initially deposited thin nickel layer) which is possibly introduced during the application of the zinc-nickel coating in the steel sheet material. The heat treatment causes the hydrogen atoms embedded in the structure of the steel sheet material to be expelled by effusion. The hydrogen embrittlement of the steel sheet material is thus counteracted.

However, there is a risk that the nickel coating layer deposited onto the steel substrate is not enough efficient regarding the prevention of hydrogen absorption into the steel.

SUMMARY OF THE INVENTION

An object of the present invention is to provide a press hardening method wherein the hydrogen adsorption into the carbon steel sheet is prevented.

Another object of the present invention is to provide a part having excellent resistance to delayed cracking obtainable by said press-hardening method including hot-forming.

The present invention provides a press hardening method comprising the following steps:

a) provision of a carbon steel sheet coated with a barrier pre-coating comprising nickel and chromium, wherein the weight ratio Ni/Cr is between 1.5 and 9, b) cutting of the coated carbon steel sheet to obtain a blank, c) thermal treatment of the blank, d) transfer of the blank into a press tool, e) hot-forming of the blank to obtain a part, d) cooling of the part obtained at step e) in order to obtain a microstructure in steel being martensitic or martensitic-bainitic or made of at least 75% of equiaxed ferrite, from 5 to 20% of martensite, and bainite in amount less than or equal to 10%.

In certain embodiments, the carbon steel sheet is step a) is coated with a barrier pre-coating comprising nickel and chromium in the weight ratio Ni/Cr of between 2.3 and 9.

In certain embodiments, the carbon steel sheet is step a) is coated with a barrier pre-coating comprising nickel and chromium in the weight ratio Ni/Cr of between 3 and 5.6.

In certain embodiments, the barrier pre-coating in step a) comprises from 55 to 90% by weight of nickel.

In certain embodiments, the barrier pre-coating in step a) comprises from 70 to 90% by weight of nickel.

In certain embodiments, the barrier pre-coating in step a) comprises from 75 to 85% by weight of nickel.

In certain embodiments, the barrier pre-coating in step a) comprises from 10 to 40% of chromium.

In certain embodiments, the barrier pre-coating in step a) comprises from 10 to 30% of chromium.

In certain embodiments, the barrier pre-coating in step a) comprises from 15 to 25% of chromium.

In certain embodiments, the barrier pre-coating in step a) does not comprise at least one of the element chosen from Zn, Al, B, N and Mo.

In certain embodiments, the barrier pre-coating in step a) consists of Cr and Ni.

In certain embodiments, the barrier pre-coating in step a) has a thickness between 10 and 550 nm.

In certain embodiments, the thickness of the barrier pre-coating in step a) is between 10 and 90 nm.

In certain embodiments, the thickness of the barrier pre-coating in step a) is between 150 and 250 nm.

In certain embodiments, in step a), the carbon steel sheet is directly topped by an anticorrosion pre-coating, and the anticorrosion pre-coating layer is directly topped by the barrier pre-coating.

In certain embodiments, the anticorrosion pre-coating in step a) comprises at least one of the metals selected from the group comprising zinc, aluminum, copper, magnesium, titanium, nickel, chromium, manganese and their alloys.

In certain embodiments, the anticorrosion pre-coating in step a) is based on aluminum or based on zinc.

In certain embodiments, the anticorrosion pre-coating in step a) is based on aluminum and comprises less than 15% Si, less than 5.0% Fe, optionally 0.1 to 8.0% Mg and optionally 0.1 to 30.0% Zn, the remainder being Al.

In certain embodiments, the anticorrosion pre-coating in step a) is based on zinc and comprises from up to 0.3% Al, the remainder being Zn.

In certain embodiments, the barrier pre-coating of step a) is deposited by physical vapor deposition, by electro-galvanization, hot-dip galvanization or roll-coating.

In certain embodiments, the thermal treatment in step c) is performed at a temperature between 80° and 950° C.

In certain embodiments, the thermal treatment in step c) is performed at a temperature between 84° and 950° C. to obtain a fully austenitic microstructure in the steel.

In certain embodiments, the thermal treatment in step c) is performed during a dwell time between 1 to 12 minutes in an inert atmosphere or an atmosphere comprising air.

In certain embodiments, the hot-forming of the blank in step e) is at a temperature between 60° and 830° C.

The present invention also provides a part obtained by the method comprising the following steps:

a) provision of a carbon steel sheet coated with a barrier pre-coating comprising nickel and chromium, wherein the weight ratio Ni/Cr is between 1.5 and 9,
b) cutting of the coated carbon steel sheet to obtain a blank,
c) thermal treatment of the blank,
d) transfer of the blank into a press tool,
e) hot-forming of the blank to obtain a part,
d) cooling of the part obtained at step e) in order to obtain a microstructure in steel being martensitic or martensitic-bainitic or made of at least 75% of equiaxed ferrite, from 5 to 20% of martensite, and bainite in amount less than or equal to 10%.

In certain embodiments, the part comprises a carbon steel sheet coated with a barrier pre-coating comprising nickel and chromium, such barrier coating being alloyed through diffusion with the carbon steel sheet.

In certain embodiments, the part comprises the carbon steel sheet directly topped by an anticorrosion pre-coating, this anticorrosion pre-coating layer being directly topped by the barrier pre-coating, such barrier coating being alloyed through diffusion with the anticorrosion coating, the anticorrosion coating being alloyed with the carbon steel sheet.

The present invention further provides a method for manufacture of an automotive vehicle comprising manufacturing an automotive vehicle comprising a part obtained by the method comprising the following steps:

a) provision of a carbon steel sheet coated with a barrier pre-coating comprising nickel and chromium, wherein the weight ratio Ni/Cr is between 1.5 and 9,
b) cutting of the coated carbon steel sheet to obtain a blank,
c) thermal treatment of the blank,
d) transfer of the blank into a press tool,
e) hot-forming of the blank to obtain a part,
d) cooling of the part obtained at step e) in order to obtain a microstructure in steel being martensitic or martensitic-bainitic or made of at least 75% of equiaxed ferrite, from 5 to 20% of martensite, and bainite in amount less than or equal to 10%.

Other characteristics and advantages of the invention will become apparent from the following detailed description of the invention.

Definitions

The following terms will be defined:

all percentage "%" are defined by weight and

"carbon steel sheet" means a steel sheet having less than 10.5% by weight of chromium. For example, stainless steel is not included in the definition of a carbon steel sheet.

DETAILED DESCRIPTION

Any steel can be advantageously used in the frame of the invention. However, in case steel having high mechanical strength is needed, in particular for parts of structure of automotive vehicle, steel having a tensile resistance superior to 500 MPa, advantageously between 500 and 2000 MPa before or after heat-treatment, can be used. The weight composition of carbon steel sheet is preferably as follows: $0.03\% \leq C \leq 0.50\%$; $0.3\% \leq Mn \leq 3.0\%$; $0.05\% \leq Si \leq 0.8\%$; $0.015\% \leq Ti \leq 0.2\%$; $0.005\% \leq Al \leq 0.1\%$; $0\% \leq Cr \leq 2.50\%$; $0\% \leq S \leq 0.05\%$; $0\% \leq P \leq 0.1\%$; $0\% \leq B \leq 0.010\%$; $0\% \leq Ni \leq 2.5\%$; $0\% \leq Mo \leq 0.7\%$; $0\% \leq Nb \leq 0.15\%$; $0\% \leq N \leq 0.015\%$; $0\% \leq Cu \leq 0.15\%$; $0\% \leq Ca \leq 0.01\%$; $0\% \leq W \leq 0.35\%$, the balance being iron and unavoidable impurities from the manufacture of steel.

For example, the carbon steel sheet is 22MnB5 with the following composition: $0.20\% \leq C \leq 0.25\%$; $0.15\% \leq Si \leq 0.35\%$; $1.10\% \leq Mn \leq 1.40\%$; $0\% \leq Cr \leq 0.30\%$; $0\% \leq Mo \leq 0.35\%$; $0\% \leq P \leq 0.025\%$; $0\% \leq S \leq 0.005\%$; $0.020\% \leq Ti \leq 0.060\%$; $0.020\% \leq Al \leq 0.060\%$; $0.002\% \leq B \leq 0.004\%$, the balance being iron and unavoidable impurities from the manufacture of steel.

The carbon steel sheet can be Usibor®2000 with the following composition: $0.24\% \leq C \leq 0.38\%$; $0.40\% \leq Mn \leq 3\%$; $0.10\% \leq Si \leq 0.70\%$; $0.015\% \leq Al \leq 0.070\%$; $0\% \leq Cr \leq 2\%$; $0.25\% \leq Ni \leq 2\%$; $0.020\% \leq Ti \leq 0.10\%$; $0\% \leq Nb \leq 0.060\%$; $0.0005\% \leq B \leq 0.0040\%$; $0.003\% \leq N \leq 0.010\%$; $0.0001\% \leq S \leq 0.005\%$; $0.0001\% \leq P \leq 0.025\%$; it being understood that the contents of titanium and nitrogen satisfy $Ti/N > 3.42$; and that the contents of carbon, manganese, chromium and silicon satisfy:

$$2.6C + \frac{Mn}{5.3} + \frac{Cr}{13} + \frac{Si}{15} \geq 1.1\%$$

the composition optionally comprising one or more of the following: 0.05%≤Mo≤0.65%; 0.001%≤W≤0.30%; 0.0005%≤Ca≤0.005%, the balance being iron and unavoidable impurities from the manufacture of steel.

For example, the Carbon steel sheet is Ductibor®500 with the following composition: 0.040%≤C≤0.100%; 0.80%≤Mn≤2.00%; 0%≤Si≤0.30%; 0%≤S≤0.005%; 0%≤P≤0.030%; 0.010%≤Al≤0.070%; 0.015%≤Nb≤0.100%; 0.030%≤Ti≤0.080%; 0%≤N≤0.009%; 0%≤Cu≤0.100%; 0%≤Ni≤0.100%; 0%≤Cr≤0.100%; 0%≤Mo≤0.100%; 0%≤Ca≤0.006%, the balance being iron and unavoidable impurities from the manufacture of steel.

Carbon steel sheet can be obtained by hot rolling and optionally cold rolling depending on the desired thickness, which can be for example between 0.7 and 3.0 mm.

The invention relates to a press hardening method comprises the following steps:

- the provision of a carbon steel sheet coated with a barrier pre-coating comprising nickel and chromium wherein the weight ratio Ni/Cr is between 1.5 and 9, preferably between 2.3 and 9 and more preferably between 3 and 5.6,
- the cutting of the coated carbon steel sheet to obtain a blank,
- the thermal treatment of the blank,
- the transfer of the blank into a press tool,
- the hot-forming of the blank to obtain a part,
- the cooling of the part obtained at step in order to obtain a microstructure in steel being martensitic or martensitic-bainitic or made of at least 75% of equiaxed ferrite, from 5 to 20% of martensite, and bainite in amount less than or equal to 10%.

Indeed, without willing to be bound by any theory, the inventors have surprisingly found that when a pre-coating comprising nickel and chromium, the ratio Ni/Cr being in the above specific range, is deposited on a carbon steel sheet, this coating acts like a barrier that prevents the adsorption of hydrogen into the carbon steel sheet. Indeed, it is believed that specifics complexes oxides are formed on the surface of the coating having the specific ratio Ni/Cr and act like a barrier by inhibiting the H2 adsorption during the thermal treatment, in particular the austenitization treatment.

Optionally, in step a), the barrier pre-coating comprises impurities chosen from Sr, Sb, Pb, Ti, Ca, Mn, Sn, La, Ce, Cr, Zr or Bi, the content by weight of each additional element being inferior to 0.3% by weight.

Advantageously, in step a), the barrier pre-coating comprises from 55 to 90%, preferably from 70 to 90%, more preferably from 75 to 85% by weight of nickel.

Preferably, in step a), the barrier pre-coating comprises from 10 to 40%, preferably from 10 to 30% and advantageously from 15 to 25% of chromium.

In a preferred embodiment, in step a), the barrier pre-coating does not comprise at least one of the elements chosen from Zn, B, N, Al and Mo. Indeed, without willing to be bound by any theory, there is a risk that the presence of at least one of these elements decreases the barrier effect of the coating.

Preferably, in step a), the barrier pre-coating consists of Cr and Ni, i.e. the barrier coating comprises only Ni and Cr and optional impurities.

Preferably, in step a), the barrier pre-coating has a thickness between 10 and 550 nm and more preferably between 10 and 90. In another preferred embodiment, the thickness is between 150 and 250 nm. For example, the thickness of the barrier coating is of 50 or 200 nm.

Without willing to be bound by any theory, it seems that when the barrier pre-coating is below 10 nm, there is a risk that hydrogen absorbs into steel because the barrier coating does not covers enough the carbon steel sheet. When the barrier pre-coating is above 550 nm, it seems that there is a risk that the barrier coating becomes more brittle and that the hydrogen absorption begins due to the barrier coating brittleness.

In step a), the carbon steel sheet can be directly topped by an anticorrosion pre-coating, this anticorrosion pre-coating layer being directly topped by the barrier pre-coating. For example, the anticorrosion pre-coating comprises at least one of the metal selected from the group comprising zinc, aluminum, copper, magnesium, titanium, nickel, chromium, manganese and their alloys. Preferably, the anticorrosion coating is based on aluminum or based on zinc.

In a preferred embodiment, the anticorrosion pre-coating based on aluminum comprises less than 15% Si, less than 5.0% Fe, optionally 0.1 to 8.0% Mg and optionally 0.1 to 30.0% Zn, the remainder being Al. For example, the anticorrosion coating is AluSi®.

In another preferred embodiment, the anticorrosion pre-coating based on zinc comprises up to 0.3% Al, the remainder being Zn. For example, the anticorrosion coating is a zinc coating so to obtain the following product: Usibor® GI.

The anticorrosion pre-coating can also comprise impurities and residual elements such iron with a content up to 5.0%, preferably 3.0%, by weight.

The pre-coatings can be deposited by any methods known to the man skilled in the art, for example hot-dip galvanization process, roll coating, electrogalvanization process, physical vapor deposition such as jet vapor deposition, magnetron sputtering or electron beam induced deposition. Preferably, the barrier pre-coating is deposited by electron beam induced deposition or roll coating. After the deposition of the pre-coatings, a skin-pass can be realized and allows work hardening the coated carbon steel sheet and giving it a roughness facilitating the subsequent shaping. A degreasing and a surface treatment can be applied in order to improve for example adhesive bonding or corrosion resistance.

After the provision of the carbon steel sheet pre-coated with the metallic coating according to the present invention, the coated carbon steel sheet is cut to obtain a blank. A thermal treatment is applied to the blank in a furnace. Preferably, the thermal treatment is performed under non protective atmosphere or under protective atmosphere at a temperature between 80° and 950° C. More preferably, the thermal treatment is performed at an austenitization temperature Tm usually between 84° and 950° C., preferably 880 to 930° C. Advantageously, said blank is maintained during a dwell time tm between 1 to 12 minutes, preferably between 3 to 9 minutes. During the thermal treatment before the hot-forming, the coating forms an alloy layer having a high resistance to corrosion, abrasion, wear and fatigue.

At ambient temperature, the mechanism of absorption of hydrogen into steel is different from high temperature, in particular the austenitization treatment. Indeed, usually at high temperature, the water in the furnace dissociates at the surface of the steel sheet into hydrogen and oxygen. Without willing to be bound by any theory, it is believed that the barrier coating comprising nickel and chromium can prevent water dissociation at the barrier coating surface and also prevent the hydrogen diffusion through the coating.

After the thermal treatment, the blank is then transferred to a hot-forming tool and hot-formed at a temperature between 60° and 830° C. The hot-forming can be the hot-stamping or the roll-forming. Preferably, the blank is hot-stamped. The part is then cooled in the hot-forming tool or after the transfer to a specific cooling tool.

The cooling rate is controlled depending on the steel composition, in such a way that the final microstructure after the hot-forming comprises mostly martensite, preferably contains martensite, or martensite and bainite, or is made of at least 75% of equiaxed ferrite, from 5 to 20% of martensite and bainite in amount less than or equal to 10%.

A hardened part having excellent resistance to delayed cracking according to the invention is thus obtained by hot forming. Preferably, the part comprises a carbon steel sheet pre-coating with a barrier pre-coating comprising nickel and chromium, such barrier coating being alloyed through diffusion with the carbon steel sheet. More preferably, a part comprises the carbon steel sheet directly topped by an anticorrosion pre-coating, this anticorrosion pre-coating layer being directly topped by the barrier pre-coating, such barrier coating being alloyed through diffusion with the anticorrosion coating, the anticorrosion coating being alloyed with the carbon steel sheet.

For automotive application, after phosphating step, the part is dipped in an e-coating bath. Usually, the thickness of the phosphate layer is between 1 and 2 μm and the thickness of the e-coating layer is between 15 and 25 μm, preferably inferior or equal to 20 μm. The cataphoresis layer ensures an additional protection against corrosion.

After the e-coating step, other paint layers can be deposited, for example, a primer coat of paint, a basecoat layer and a top coat layer.

Before applying the e-coating on the part, the part is previously degreased and phosphated so as to ensure the adhesion of the cataphoresis.

The invention will now be explained in trials carried out for information only. They are not limiting.

EXAMPLES

For all samples, carbon steel sheets used are 22MnB5. The composition of the steel is as follows: C=0.2252%; Mn=1.1735%; P=0.0126%, S=0.0009%; N=0.0037%; Si=0.2534%; Cu=0.0187%; Ni=0.0197%; Cr=0.180%; Sn=0.004%; Al=0.0371%; Nb=0.008%; Ti=0.0382%; B=0.0028%; Mo=0.0017%; As=0.0023% et V=0.0284%.

Some carbon steel sheets are coated with a 1st coating being an anti-corrosion coating called hereinafter "AluSi®". This coating comprises 9% by weight of Silicon, 3% by weight of iron, the balance being aluminum. It is deposited by hot-dip coating.

Some carbon steel sheets are coated with a 2nd coating deposited by magnetron sputtering.

Example 1: Hydrogen Test

This test is used to determine the quantity of hydrogen adsorbed during the austenitization thermal treatment of a press hardening method.

Trials 1, 3 and 5 are naked carbon steel sheets, i.e. no coating is applied on the carbon steel sheet.

Trials 2, 4 and 6 are carbon steel sheets coated with a coating comprising 80% of Ni and 20% of Cr.

Trial 7 is a carbon steel sheet coated only with an AluSi® coating.

Trial 8 is a carbon steel sheet coated with a 1st coating being AluSi® and a 2nd coating being WN.

Trial 9 is a carbon steel sheet coated with 1st coating being AluSi® and a 2nd coating being CrN.

Trial 10 is a carbon steel sheet coated with a 1st coating being AluSi® and a 2nd coating comprising 40% of Ni and 60% of Cr.

Trial 11 is a carbon steel sheet coated with a 1st coating being AluSi® and a 2nd coating being $SiO_2$.

Trial 12 is a Carbon steel sheet coated with a 1st coating being AluSi® and a 2nd coating being Ti.

Trial 13 is a carbon steel sheet coated with a 1st coating being AluSi® and a 2nd coating being Cr.

Trial 14 is a carbon steel sheet coated with a 1st coating being AluSi® and a 2nd coating being Ag.

Trial 15 is a carbon steel sheet coated with a 1st coating being AluSi® and a 2nd coating being Y.

Trial 16 is a carbon steel sheet coated with a 1st coating being AluSi® and a 2nd coating being Mo.

Trial 17 is a carbon steel sheet coated with a 1st coating being AluSi® and a 2nd coating being Au.

Trial 18 is a carbon steel sheet coated with a 1st coating being AluSi® and a 2nd coating being W.

Trial 19 is a carbon steel sheet coated with a 1st coating being AluSi® and a 2nd coating being Inox 316L. Inox 316L comprises 65% of Fe, 0.03% of C, 12% of Ni, 17% of Cr, 2% of Mn, 1% of Si and 2.5% of Mo.

Trial 20 is a carbon steel sheet coated with 1st coating being AluSi® and a 2nd coating being Inconel 690. Inconel 690 comprises from 7 to 11% by weight of Fe, 0.05% of C, from 57 to 65% of Ni, from 27 to 31% of Cr, 0.05% of Mn and 0.5% Si.

Trials 21, 22 are carbon steel sheets coated with a 1st coating being AluSi® and a 2nd coating comprising 80% of Ni and 20% of Cr.

Trials 7 to 22 have an AluSi® thickness of 25 μm.

Trial 23 is a carbon steel sheet coated with a 1st coating being AluSi®.

Trial 24 is a carbon steel sheet coated with a 1st coating being AluSi® and a 2nd coating being Ni.

Trials 25 is carbon steel sheet coated with a 1st coating being AluSi® and a 2nd coating comprising 80% of Ni and 20% of Cr.

Trials 23 to 25 have an AluSi® thickness of 14 μm.

After the deposition of the coated carbon steel sheets, coated trials were cut in order to obtain a blank. Blanks were then heated at a temperature of 900° C. during a dwell time varying between 5 and 10 minutes. Blanks were transferred into a press tool and hot-stamped in order to obtain parts having an omega shape. Then, parts were cooled by dipping trials into warm water to obtain a hardening by martensitic transformation.

Finally, the hydrogen amount adsorbed by the trials during the heat treatment was measured by thermic desorption using a TDA or Thermal Desorption Analyser. To this end, each trial was placed in a quartz room and heated slowly in an infra-red furnace under a nitrogen flow. The released mixture hydrogen/nitrogen was picked up by a leak detector and the hydrogen concentration was measured by a mass spectrometer. Results are shown in the following Table 1:

| Trials | Carbon steel sheet thickness (mm) | 1st coating | Thickness (μm) | 2nd coating | Ratio Ni/Cr | Thickness (nm) | $H_2$ amount (ppm by mass) |
|---|---|---|---|---|---|---|---|
| 1 | 1 | — | — | — | — | — | 0.27 |
| 2* | 1 | — | — | Ni/Cr 80/20 | 4 | 100 | 0.056 |
| 3 | 1.5 | — | — | — | — | — | 0.31 |
| 4* | 1.5 | — | — | Ni/Cr 80/20 | 4 | 100 | 0.066 |
| 5 | 2 | — | — | — | — | — | 0.39 |
| 6* | 2 | — | — | Ni/Cr 80/20 | 4 | 100 | 0.17 |
| 7 | 1.5 | AluSi ® | 25 | — | — | — | 0.61 |
| 8 | 1.5 | AluSi ® | 25 | WN | — | 200 | 0.48 |
| 9 | 1.5 | AluSi ® | 25 | CrN | — | 200 | 0.44 |
| 10 | 1.5 | AluSi ® | 25 | Ni/Cr 40/60 | 0.67 | 200 | 0.34 |
| 11 | 1.5 | AluSi ® | 25 | $SiO_2$ | — | 200 | 0.51 |
| 12 | 1.5 | AluSi ® | 25 | Ti | — | 200 | 0.85 |
| 13 | 1.5 | AluSi ® | 25 | Cr | — | 200 | 0.40 |
| 14 | 1.5 | AluSi ® | 25 | Ag | — | 200 | 0.49 |
| 15 | 1.5 | AluSi ® | 25 | Y | — | 200 | 0.80 |
| 16 | 1.5 | AluSi ® | 25 | Mo | — | 200 | 0.48 |
| 17 | 1.5 | AluSi ® | 25 | Au | — | 200 | 0.65 |
| 18 | 1.5 | AluSi ® | 25 | W | — | 200 | 1.00 |
| 19 | 1.5 | AluSi ® | 25 | Inox 316L | 0.7 | 200 | 0.5 |
| 20* | 1.5 | AluSi ® | 25 | Inconel 690 | 2.1 to 2.097 | 200 | 0.3 |
| 21* | 1.5 | AluSi ® | 25 | Ni/Cr 80/20 | 4 | 200 | 0.27 |
| 22* | 1.5 | AluSi ® | 25 | Ni/Cr 80/20 | 4 | 500 | 0.27 |
| 23 | 1.5 | AluSi ® | 14 | — | — | — | 0.73 |
| 24 | 1.5 | AluSi ® | 14 | Ni | — | 200 | 0.54 |
| 25* | 1.5 | AluSi ® | 14 | Ni/Cr 80/20 | 4 | 200 | 0.34 |

*examples according to the invention.

Firstly, we can see that trials 2, 4 and 6 comprising a barrier coating according to the present invention release less hydrogen amount with respect to the trials 1, 3 and 5 without any barrier coating.

Secondly, we can see that Trials 8 to 19 having a 2nd coating different from the one of the present invention and Trial 7 having no barrier coating release more hydrogen than Trials 20 to 22 according to the present invention.

We can also see the importance of the ratio Ni/Cr in the 2nd coating in Trial 10 and 21. Indeed, Trial 10 having a ratio Ni/Cr outside the invention range releases more hydrogen than Trial 21 according to the present invention.

Moreover, we can see with Trials 21 and 22 that the thickness of the 2nd coating Ni/Cr 80/20 show excellent results with two different thicknesses.

Finally, we can see that trial 25 having a barrier coating according to the present invention releases less hydrogen than Trials 23 and 24, even when the thickness of AluSi® changes.

What is claimed is:

1. A press hardening method comprising the following steps:

a) provision of a carbon steel sheet coated with a barrier pre-coating comprising nickel and chromium, wherein the weight ratio Ni/Cr is between 1.5 and 9, b) cutting of the coated carbon steel sheet to obtain a blank, c) thermal treatment of the blank, d) transfer of the thermally treated blank into a press tool, e) hot-forming of the transferred thermally treated blank to obtain a part, f) cooling of the part obtained at step e) in order to obtain a microstructure in steel that is martensitic or martensitic-bainitic or made of at least 75% of equiaxed ferrite, from 5 to 20% of martensite, and bainite in amount less than or equal to 10%, wherein the carbon steel sheet of step a) is directly topped by an anticorrosion pre-coating layer, this anticorrosion pre-coating layer being directly topped by the barrier pre-coating.

2. The press hardening method according to claim 1, wherein the anticorrosion pre-coating comprises at least one metal selected from the group comprising zinc, aluminum, copper, magnesium, titanium, nickel, chromium, manganese and their alloys.

3. The press hardening method according to claim 1, wherein the anticorrosion pre-coating is based on aluminum or based on zinc.

4. The press hardening method according to claim 1, wherein the anticorrosion pre-coating is based on aluminum and comprises less than 15% Si, less than 5.0% Fe, optionally 0.1 to 8.0% Mg and optionally 0.1 to 30.0% Zn, the remainder being Al.

5. The press hardening method according to claim 1, wherein the anticorrosion pre-coating is based on zinc and comprises up to 0.3% Al, the remainder being Zn.

6. The press hardening method according to claim 1, wherein the anticorrosion pre-coating includes zinc and is deposited by physical vapor deposition, by electro-galvanization, hot-dip galvanization or roll-coating.

7. The press hardening method according to claim 1, wherein said thermal heat treatment effects an alloying of the barrier pre-coating with the anti-corrosion pre-coating through diffusion and an alloying of the anti-corrosion pre-coating with the carbon steel sheet through diffusion.

8. The press hardening method according to claim 1, wherein the barrier pre-coating defines an exterior surface of the coated carbon steel sheet.

9. The press hardening method according to claim 4, wherein the barrier pre-coating defines an exterior surface of the coated carbon steel sheet.

* * * * *